US010374902B2

(12) United States Patent
He et al.

(10) Patent No.: US 10,374,902 B2
(45) Date of Patent: Aug. 6, 2019

(54) METHOD FOR CLUSTERING WIRELESS CHANNEL MPCS BASED ON A KPD DOCTRINE

(71) Applicant: Beijing Jiaotong University, Beijing (CN)

(72) Inventors: Ruisi He, Beijing (CN); Bo Ai, Beijing (CN); Qingyong Li, Beijing (CN); Qi Wang, Beijing (CN); Li'ao Gengyang, Beijing (CN); Ruifeng Chen, Beijing (CN); Zhangdui Zhong, Beijing (CN); Jian Yu, Beijing (CN)

(73) Assignee: Beijing Jiaotong University (CN)

( * ) Notice: Subject to any disclaimer, the term of this patent is extended or adjusted under 35 U.S.C. 154(b) by 5 days.

(21) Appl. No.: 15/448,255

(22) Filed: Mar. 2, 2017

(65) Prior Publication Data

US 2018/0131575 A1 May 10, 2018

(30) Foreign Application Priority Data

Nov. 7, 2016 (CN) .......................... 2016 1 0978957

(51) Int. Cl.
*H04L 12/28* (2006.01)
*H04L 12/24* (2006.01)
*H04B 7/0413* (2017.01)

(52) U.S. Cl.
CPC .......... *H04L 41/14* (2013.01); *H04B 7/0413* (2013.01); *H04L 41/0803* (2013.01)

(58) Field of Classification Search
CPC ....... H04L 41/142; H04L 41/16; H04W 16/22
USPC .......................................................... 370/255
See application file for complete search history.

(56) References Cited

U.S. PATENT DOCUMENTS 5,144,641 A * 9/1992 Akazawa .............. H04B 1/707 375/150
5,291,515 A * 3/1994 Uchida .................... H04B 1/69 370/479
2003/0235239 A1* 12/2003 Li ........................ H04B 1/7117 375/148
2004/0109494 A1* 6/2004 Kindred .............. H04B 1/7117 375/148

(Continued)

*Primary Examiner* — Asad M Nawaz
*Assistant Examiner* — Berhanu D Belete
(74) *Attorney, Agent, or Firm* — Blake E. Vande Garde; Erickson Kemell IP, LLC

(57) ABSTRACT

A Kernel-power-density based method for wireless channel multipath components (MPCs) clustering. Signals get to the receiver from a transmitter via multipath propagation. MIMO channels can be modeled as double-directional, which contains the information of power, delay, direction of departure (DOD) and direction of arrival (DOA) of MPCs. The MPCs tend to appear in clusters. All the parameters of MPCs can be estimated by using high-resolution algorithms, such as MUSIC, CLEAN, SAGE, and RiMAX. Considering a data snapshot for a certain time with several clusters, which include a number of MPCs, where each MPC is represented by its power, delay, DOD and DOA. This invention adopts a novel clustering framework by using a density based method, which can better identify the local density variations of MPCs and requires no prior knowledge about clusters. It can work for the cluster oriented channel processing technology in future wireless communication field.

8 Claims, 17 Drawing Sheets

(56) References Cited

U.S. PATENT DOCUMENTS

| | | | | |
|---|---|---|---|---|
| 2005/0157801 | A1* | 7/2005 | Gore | H04L 25/0202 375/260 |
| 2014/0254644 | A1* | 9/2014 | Gotman | H04L 27/01 375/222 |
| 2014/0341326 | A1* | 11/2014 | Choi | H04L 25/0214 375/350 |
| 2015/0282112 | A1* | 10/2015 | Bialer | G01S 1/02 455/456.1 |
| 2017/0358158 | A1* | 12/2017 | Koppelaar | B60R 25/24 |

* cited by examiner

METHOD FOR CLUSTERING WIRELESS CHANNEL MPCS BASED ON A KPD DOCTRINE

FIELD OF THE PRESENT INVENTION

The invention is related to a method for clustering wireless channel and multipath components (MPCs) based on a KPD (Kernel Power Density) Doctrine, which is used for wireless communication channel modeling and belongs to wireless mobile communication field.

PRIOR ART

Chanel modeling has been an important research topic in wireless communications, as the design and performance evaluation of any wireless communication system is based on an accurate channel model. The main goal of channel modeling is to characterize the statistical distribution of the multipath components (MPCs) in different environments. Among the models describing the distribution of MPCs, a representative one is the tapped delay line (TDL) model, which includes a number of taps that represent the superposition of a large number of MPCs and experiences small-scale fading at different delays. The TDL model has been used for a long time and accepted by many standards channel models for earlier wireless systems such as the COST 207 model.

However, 3G, 4G, and next generation systems require larger bandwidth as well as larger size of multiple-input-multiple-output (MIMO) arrays. With the high resolution of MPC on both delay and angle domains, it is possible to characterize the behavior of MPCs with more details. However, this also implies greater complexity in modeling this large number of MPCs.

A large body of MIMO measurements has shown that the MPCs are generally distributed in groups, i.e., clustered, in the real-world environments. This fact can be exploited to model the channel with reduced complexity while maintaining accuracy. To our knowledge, the earliest cluster-based channel model is the SV (Saleh-Valenzuela) model, where the MPCs are clustered in the delay domain based on measurements. In addition, a geometry-based stochastic channel model (GSCM) suitable for MIMO channels is also introduced, where the concept of MPC cluster was extended to include both delay and angular domains. Over the past 20 years, the clustering of MPCs have been widely observed in many environments and cluster based channel models have been widely adopted in standardized channel models, such as COST 259, COST 2100, 3GPP Spatial Channel Model (SCM) and WINNER.

Even though the concept of clustered MPCs is widely accepted in channel modeling, finding good clustering algorithms is very much an open and research-active topic. In the past, visual inspection has been used to cluster MPCs for a long time. Even though the human eye is good at the detection of patterns and structures in noisy data, visual inspection is too time-consuming for the clustering implementation with a large amount of multi-dimension data. Therefore, a carefully designed automatic clustering algorithm is required for channel modeling.

Even though clustering analysis is a hot research topic in the field of machine learning, considerable effort has to be made to adapt the results to clustering of MPCs in wireless channels. Since the MPC has many attributes such as power, delay, angle, and each of above attribute usually has an independent characteristic, the main challenge of MPC clustering is how to incorporate the impacts of different attributes. Several algorithms are proposed to cluster MPCs when only the power and delay attributes are available. However, they are inapplicable to the clustering of MIMO channels (which includes the angular characteristics of MPCs).

Currently, the clustering algorithms that consider all MPC parameters (power, delay and angle) are summarized as follows. In the paper by N. Czink, P. Cera, J. Salo, E. Bonek, J.-P. Nuutinen, and J. Ylitalo, “A framework for automatic clustering of parametric MIMO channel data including path powers,” in Proc. IEEE VTC’06, 2006, pp. 1-5, the K-Power-Means (KPM) algorithm is proposed. It considers the impact of MPC power when computing cluster centers and uses MPC distance to quantify the similarity between MPCs. In another paper by C. Schneider, M. Bauer, M. Narandzic, W. Kotterman, and R. S. Thoma, “Clustering of MIMO channel parameters-performance comparison,” in Proc. IEEE VTC’09, 2009, pp. 1-5, the Fuzzy c-means algorithm is used to cluster MPCs and is found to outperform the KPM when using random initialization.

Despite some progress made in automated clustering over the past 10 years, the existing works have several limitations:

The attributes of MPCs are not well incorporated into the clustering algorithm. Unlike the synthetic samples in machine learning, the attributes of real-world MPCs are caused by the physical environments and thus have certain inherent characteristics. Such anticipated behaviors of MPCs should be incorporated into the clustering algorithm. For example, many measurements show that the angle distribution of MPC clusters can be usually modeled as a Laplacian distribution, however, this characteristic has not been well considered in the design of clustering algorithm.

The number of clusters is usually required as prior information. Even though in several validity indices are compared to select the best estimation of the number of clusters, it is found that none of the indices is able to always predict correctly the desired number of clusters. Mostly, people still need to use visual inspection to ascertain the optimum number of clusters in the environment, which reduces the efficiency.

Most clustering algorithms still require many user specified parameters. For example, the KPM algorithm requires the cluster initialization (delay and angle), and usually the weight factors of delay and angle need to be adjusted to obtain a reasonable output, which is subjective. Moreover, it is difficult to find a good initialization in real-world measurements. Therefore, an algorithm with fewer user-specified parameters and easier adjustment is needed for MPC clustering.

SUMMARY OF THE PRESENT INVENTION

The object of the present invention is to provide a method for clustering wireless channel and multipath components (MPCs) based on a KPD (Kernel Power Density) Doctrine, which is a novel MIMO channel MPC clustering method.

Therefore, the purpose of this invention is to provide a Kernel-power-density based algorithm for channel MPC clustering. Signals get to the receiver via multipath propagation. MIMO channels can be modeled as double-directional, which contains the information of power, delay, direction of departure (DOD) and direction of arrival (DOA) of the MPCs. MPCs tend to appear in clusters, i.e., the MPCs in each cluster have similar parameters of power, delay, and angle. All the parameters of MPC can be estimated by using high-resolution algorithm, such as MUSIC, CLEAN, SAGE, and RiMAX. Considering a data snapshot with M clusters and T MPCs in total, where each MPC is represented by its power $\alpha$, delay $\tau$, DOD $\Omega_T$ and DOA $\Omega_R$.

According to this invention, both the statistical characteristics and power of MPCs are embodied in the Kernel density.

According to this invention, when estimating the density, only the K nearest neighbors of each MPC is considered, which can better identify the local density variations of MPCs. This method can serve for the MIMO channel MPC clustering and requires no prior knowledge about the clusters (e.g., the number of clusters and the initial position).

According to this invention, the computation complexity of this method is relative low, and thus it can work for the cluster oriented channel modeling in future wireless communication field.

In the prior art, there is no consideration of "the statistical distribution characteristics of MPCs" This is not caused by the limitation of computing tools (e.g., slide rule, abacus, single board computer with punched tape for data input, calculator, electronic tube computer and IBM workstation). The true reason is that those "experts in this field" find no appropriate method to consider it, i.e., how to describe it and how to incorporate it with the clustering problem. This invention creatively proposes the Kernel function and solves these technology problems, which incorporates "the statistical distribution characteristics of MPCs" into MPC clustering successfully.

In the prior art, among existing technologies, the consideration of "MPC power", which introduces the power factor into the distance between different MPCs, is vastly different with the proposed method, where we incorporate the power variable into the Kernel function and thus it becomes the Kernel power density.

Therefore, this invention considers the two essential means (i.e., the statistical distribution characteristics of MPCs and the power of MPCs) simultaneously to solve the technology problems, which has never been proposed by existing methods.

In the prior art, among existing technologies, many statistical characteristics of MPC parameters have not been incorporated into the clustering algorithms. It is not caused by the backward computing technology, the limited numerical calculation capability (e.g., abacus, punched card computer, single board computer, calculator and 386), or the complex mathematical models that is hard to solve, it is because that the "experts in this field" cannot find the statistical characteristics and the physical laws of MPC parameters. Hence, the defects mentioned above keep existing methods or systems from the ideas proposed in this invention.

In the prior art, among existing technologies, the number of MPC clusters is usually required as an input before clustering. But, the proposed method, which is based on density, can perform well without the information of clustering number.

The Kernel power density as the method of solving the technology problems is first proposed in this invention. The difficulties to implement the technical conception of this invention are listed below.

1) The introduction of the Kernel function: solving the problem that the statistical characteristics of MPCs are difficult to be considered in clustering.

2) The introduction of the Kernel power factor: propose the concept of Kernel power density through introducing the power density into the Kernel function.

3) The design of clustering algorithm based on the Kernel power density: calculation of relative density, search of MPC core points, clustering based on the high-density-neighboring MPC, merging of clusters based on the link map.

In summary, the technical solution of this invention is concluded after requires huge creative efforts, and we need to overcome a series of technical challenges to realize this technology solution. Moreover, this solution does produce surprisingly great technical merits.

THE BRIEF DESCRIPTION OF ACCOMPANYING DRAWINGS

BEST MODE FOR CARRYING OUT THE PRESENT INVENTION

Figure 1:
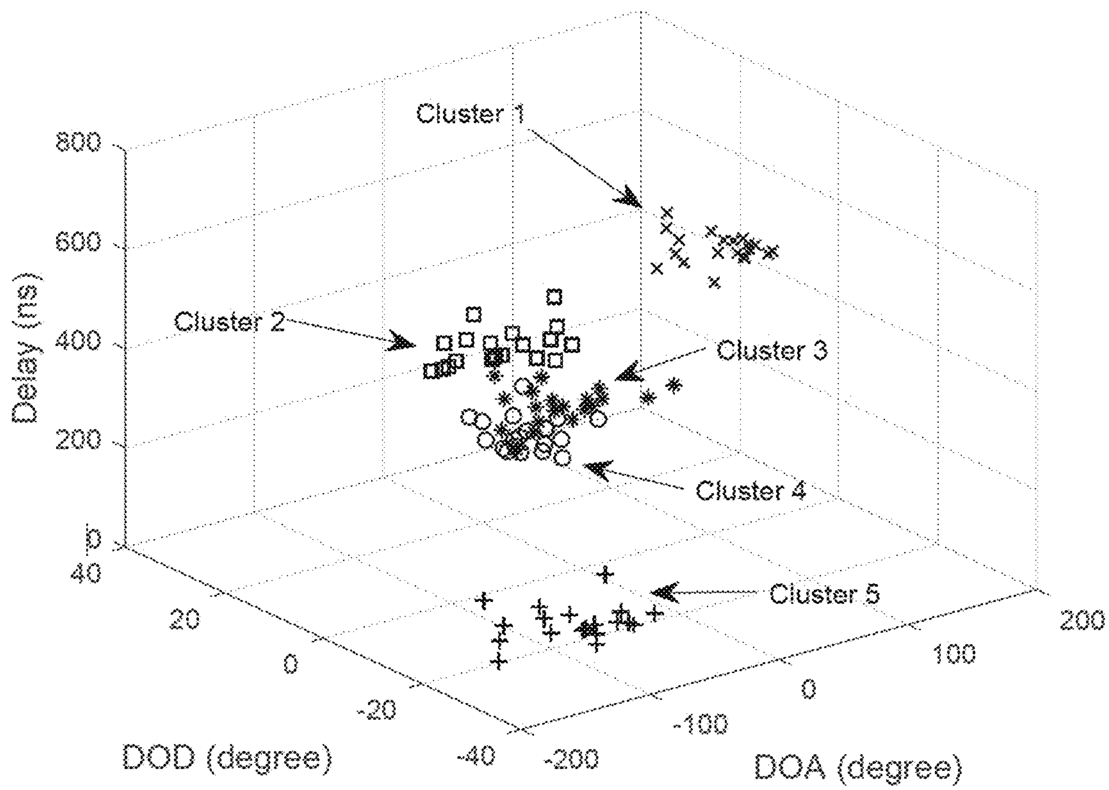
FIGS. 1A-1D illustrate KPD clustering based on simulation channels.
Figure 1:
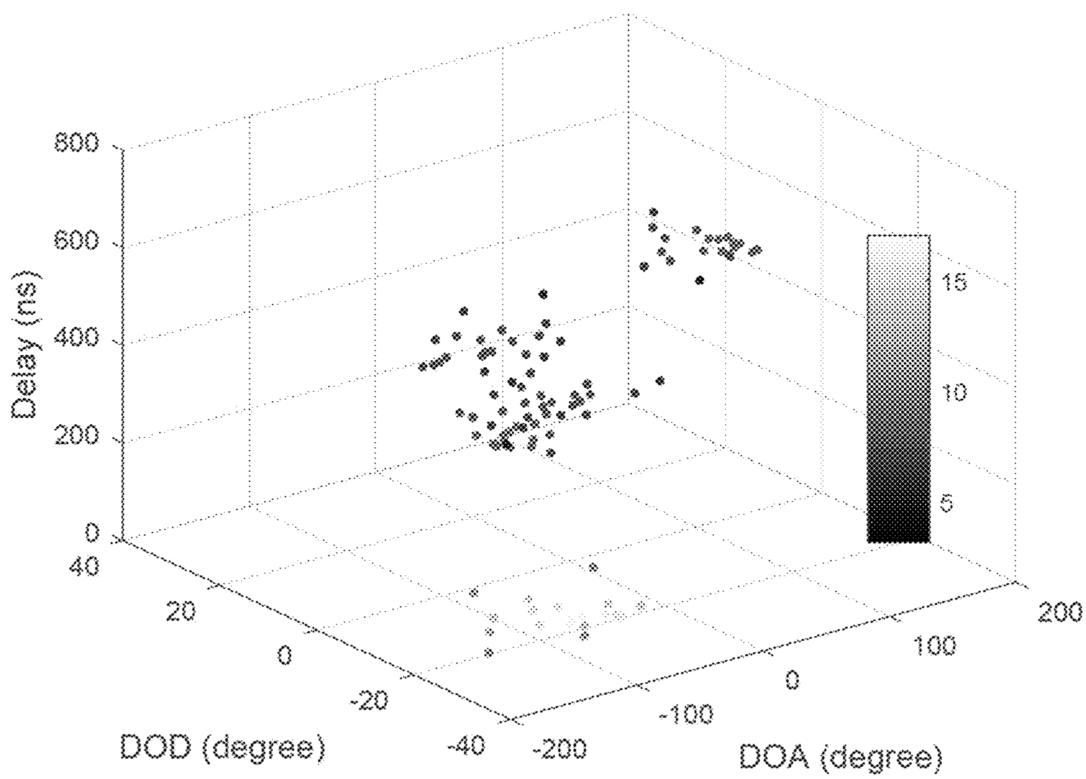
Figure 1C:
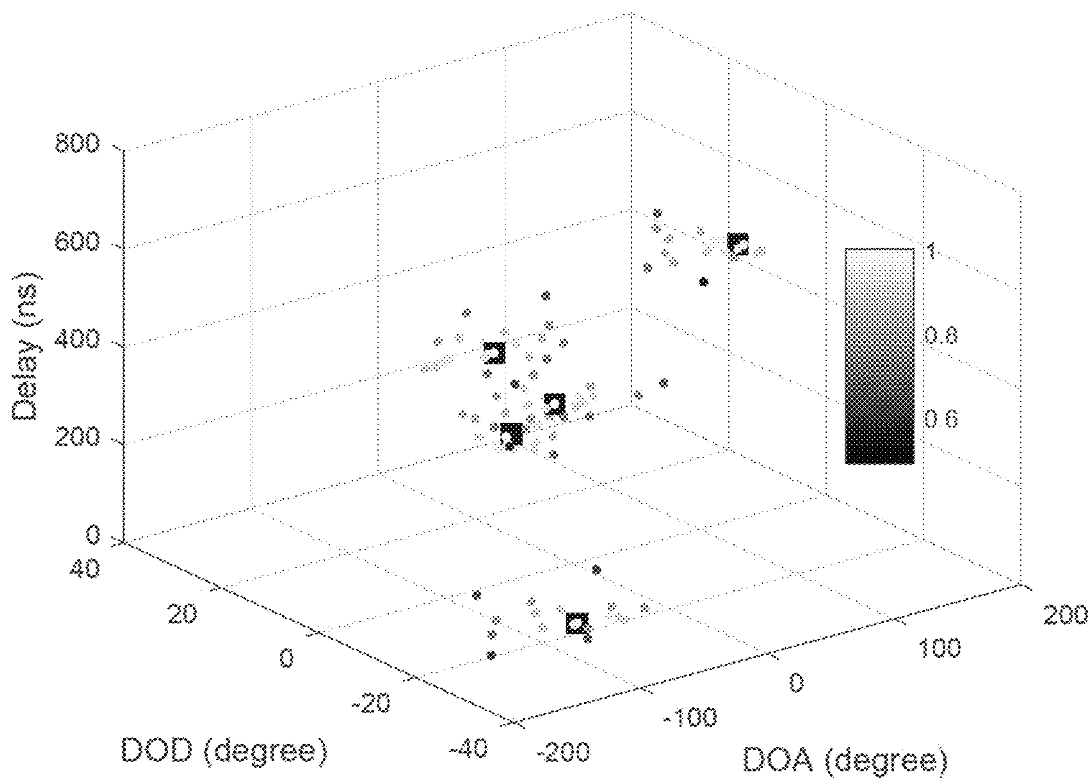
Figure 1D:
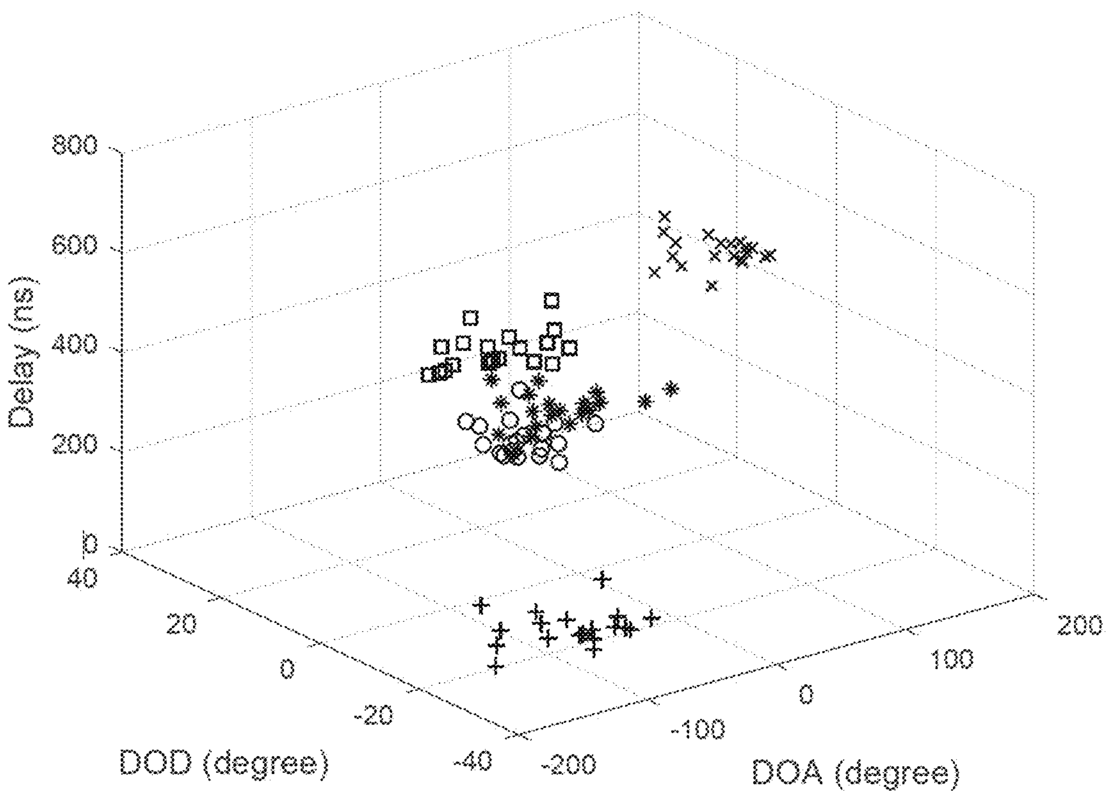

FIG. 1A shows the simulated 5 clusters of MPCs, which are plotted using different markers. FIG. 1B shows the MPC density $\rho$, where brightness indicates the level of $\rho$. FIG. 1C shows the relative density $\rho^*$, where brightness indicates the level of $\rho^*$. The 5 solid squares are the core MPCs with $\rho^*=1$. FIG. 1D shows clustering results with the KPD algorithm, where clusters are plotted with different markers.

Figure 2A:
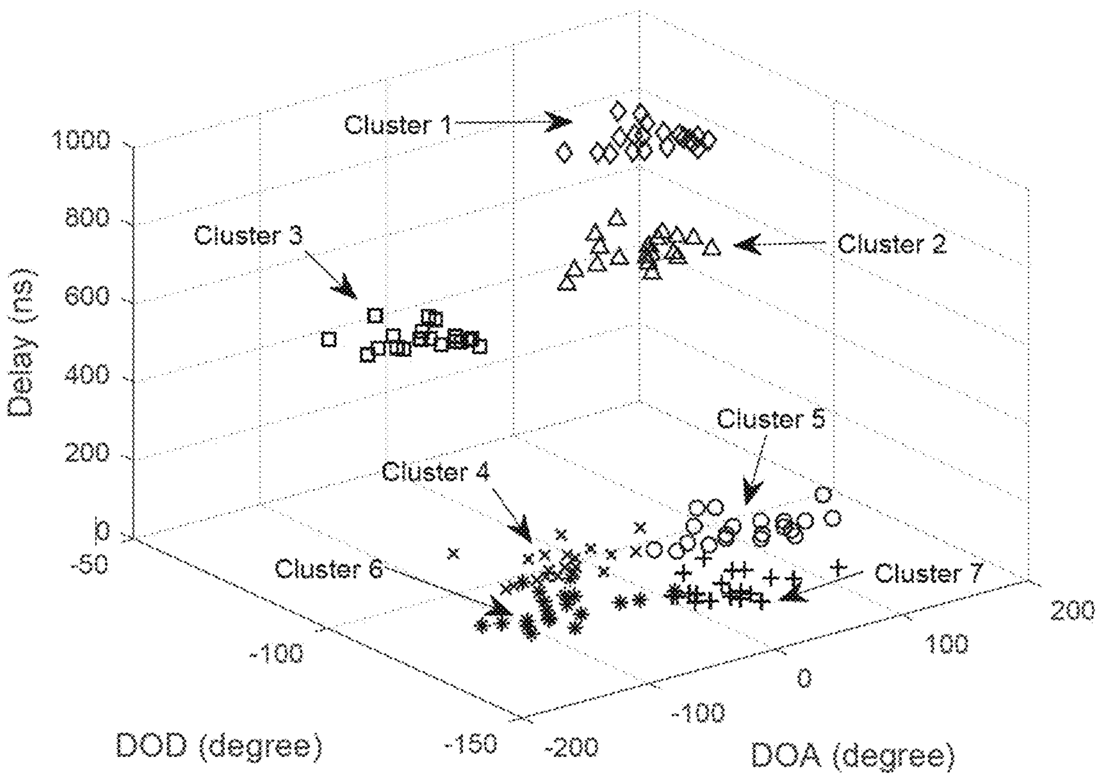
FIGS. 2A-2D illustrate KPD clustering based on simulation channels.
Figure 2B:
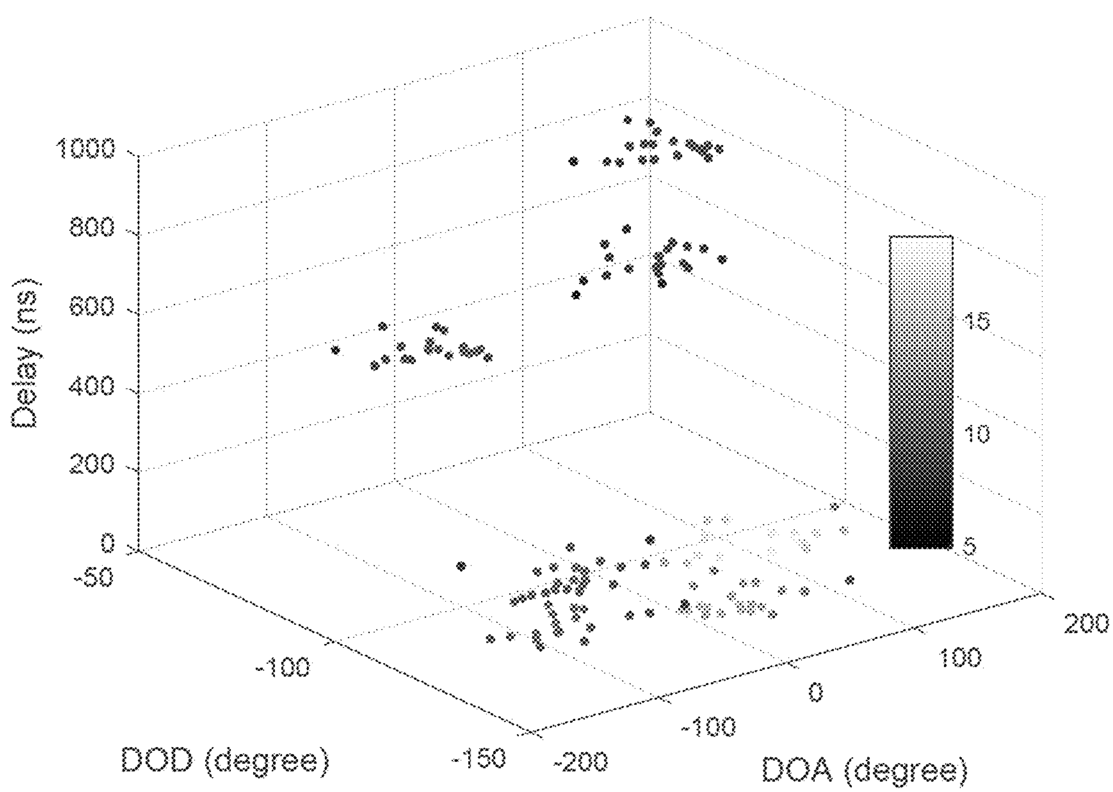
Figure 2C:
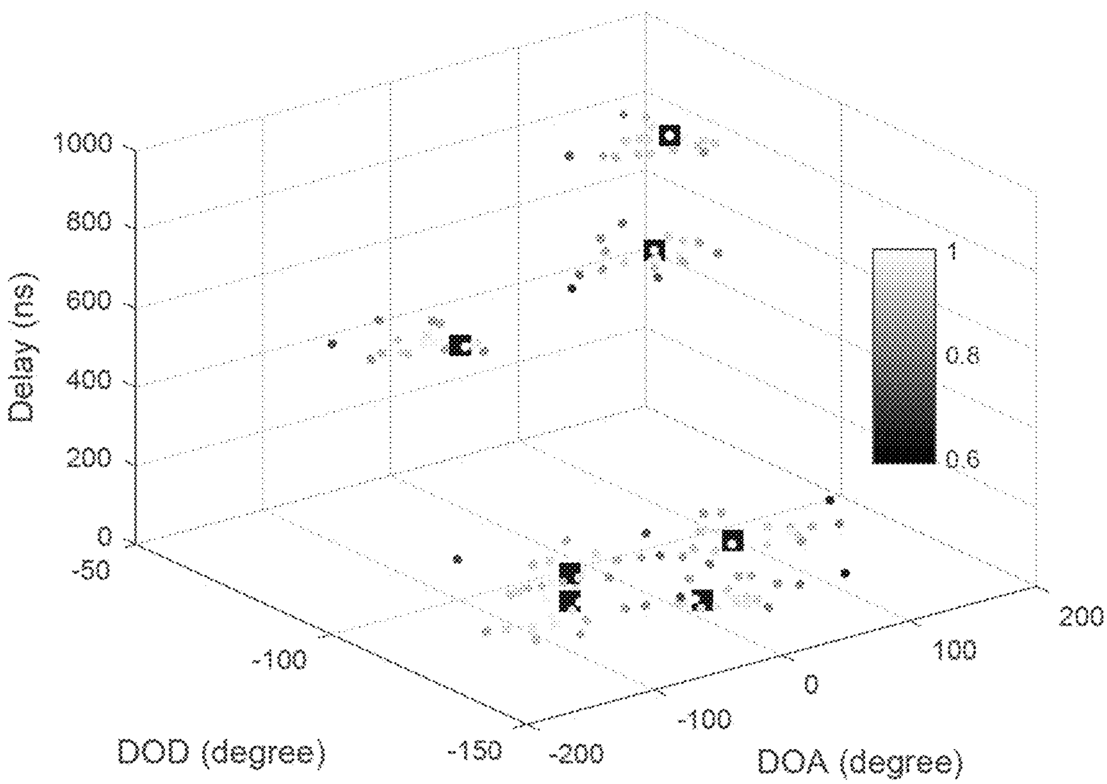
Figure 2D:
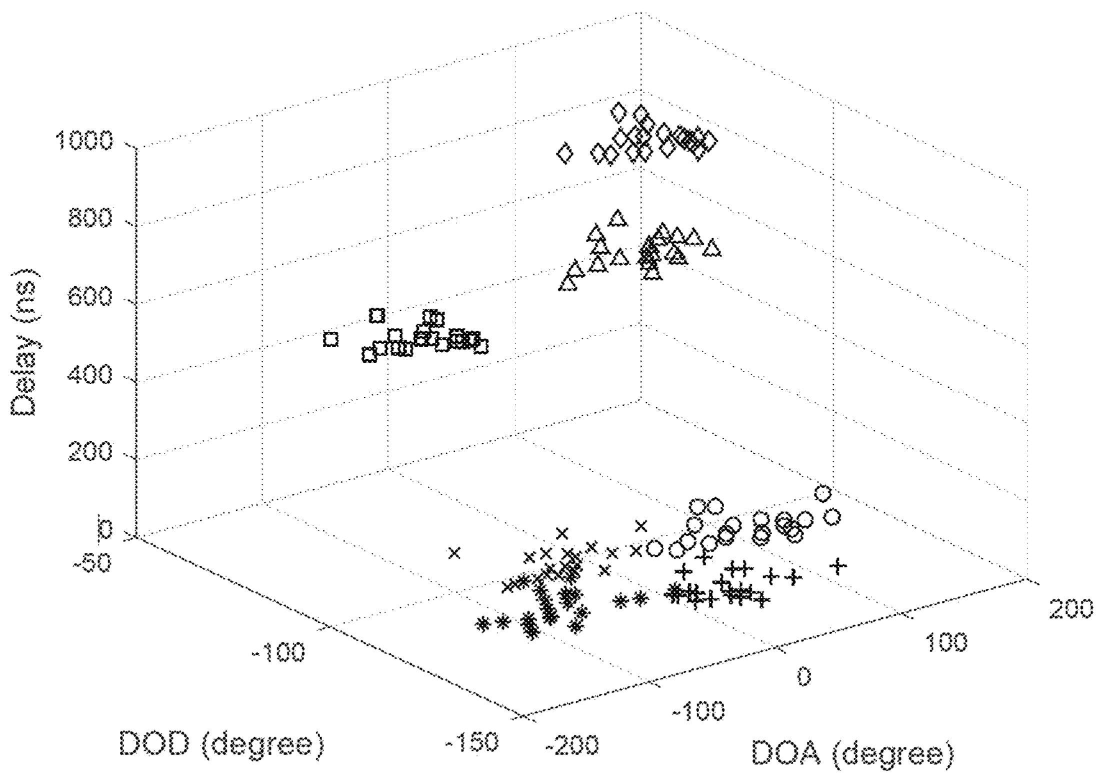

FIG. 2A shows the simulated 7 clusters of MPCs, which are plotted using different markers. FIG. 2B shows the MPC density $\rho$, where brightness indicates the level of $\rho$. FIG. 2C shows the relative density $\rho^*$, where brightness indicates the level of $\rho^*$. The 7 solid squares are the core MPCs with $\rho^*=1$. FIG. 2D shows clustering results with the KPD algorithm, where clusters are plotted with different markers.

Figure 3A:
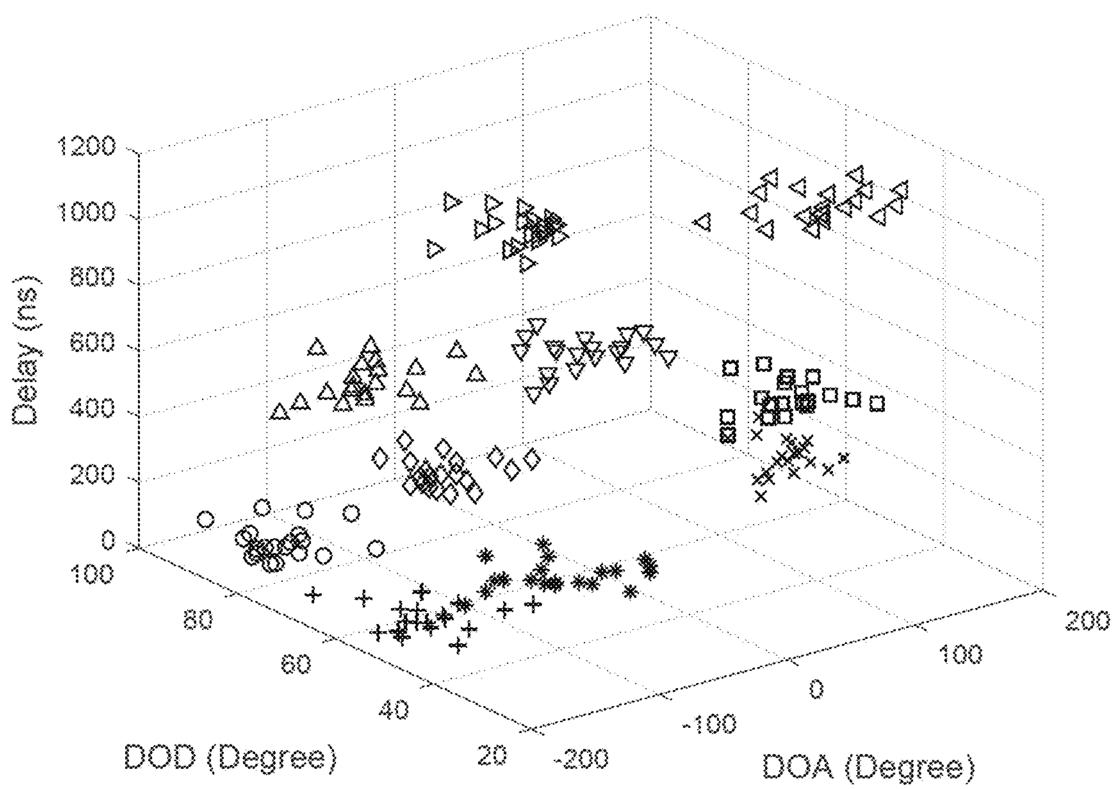
FIGS. 3A-3D show clustering algorithm validation with simulated channels.
Figure 3B:
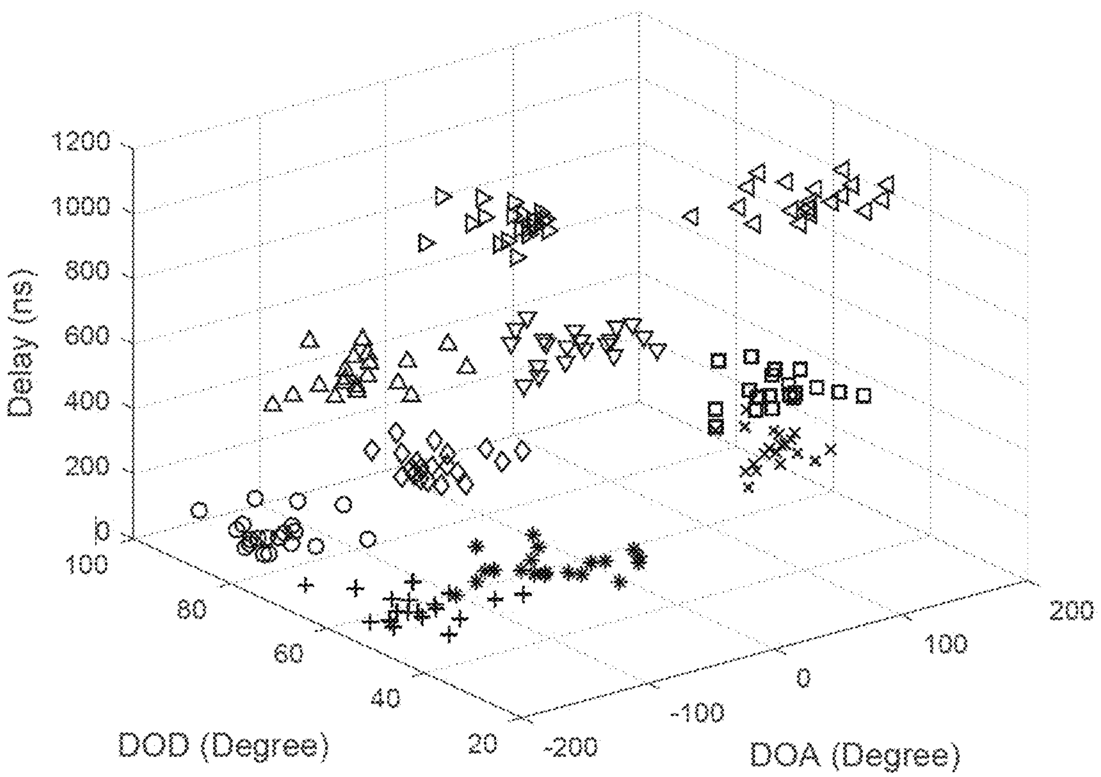
Figure 3C:
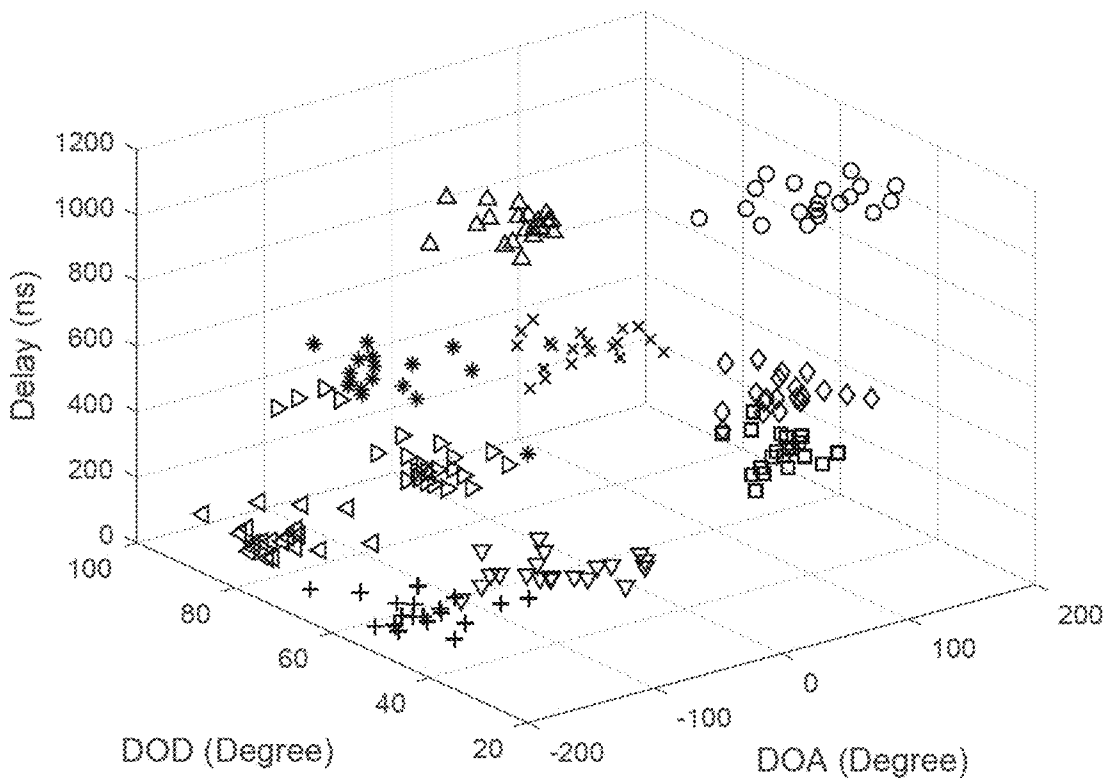
Figure 3D:
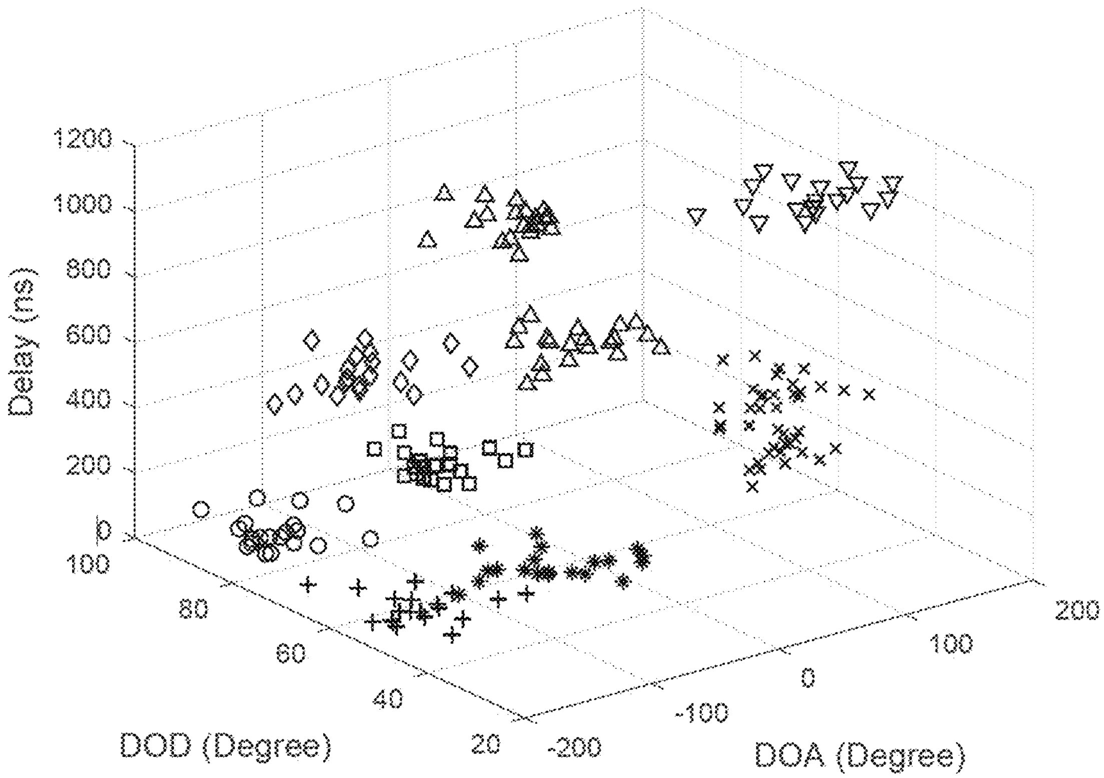

FIG. 3A shows simulated clusters of MPCs, where the raw clusters are plotted with different markers. FIG. 3B shows clustering results with the proposed KPD algorithm. FIG. 3C shows clustering results with the KPM algorithm. FIG. 3D shows clustering results with the DBSCAN algorithm.

(1) The Description of Wireless Channel

First, we describe wireless channels and parameters of MPC. In any wireless channel, the signal can get from the TX to the RX via a number of different paths. MIMO channels can be modeled as double-directional, and are characterized by the double-directional impulse response, which contains the information of power $\alpha$, delay $\tau$, DOD $\Omega$T, and DOA $\Omega$R of the MPCs. As mentioned before, MPCs tend to appear in clusters, i.e., the MPCs in each cluster have similar parameters of power, delay and angle. For each snapshot, the double directional channel impulse response h can thus be expressed as follows:

$$h(t,\tau,\Omega_T,\Omega_R)=\sum_{m=1}^{M}\left\{\sum_{n=1}^{N_m}\alpha_{m,n}e^{j\phi_{m,n}}\delta(\tau-\tau_m-\tau_{m,n})\times\delta(\Omega_T-\Omega_{T,m}-\Omega_{T,m,n})\times\delta(\Omega_R-\Omega_{R,m}-\Omega_{R,m,n})\right\} \quad (1)$$

where M is the number of cluster and $N_m$ is the number of MPCs in the m-th cluster. $\alpha_{m,n}$ and $\phi_{m,n}$ are the amplitude gain and phase of the n-th MPC in the m-th cluster, respectively. $\tau_m$, $\Omega_{T,m}$ and $\Omega_{R,m}$ are the arrival time, DOD, and DOA of the m-th cluster, respectively. $\tau_{m,n}$, $\Omega_{T,m,n}$ and $\Omega_{R,m,n}$ are the excess delay, excess DOD, and excess DOA of the n-th MPC in the m-th cluster, respectively, where excess delay is usually taken with respect to the first component in the cluster, while excess angles are taken with respect to the mean. $\delta(\cdot)$ is the Dirac delta function and t is time.

All the MPC parameters in (1) can be estimated by using high-resolution algorithm (e.g., MUSIC, CLEAN, SAGE, or RiMAX). As noted in (1), we consider one data snapshot with a number of T MPCs including M clusters, where each MPC is represented by its power $\alpha$, delay $\tau$, DOD $\Omega_T$, and DOA $\Omega_R$. The set of all the MPCs for one snapshot is $\Phi$ and each MPC is represented as x.

(2) Channel MPC Clustering Algorithm Base on Kernel-Power-Density (KPD).

To overcome the limitations of the current MPC clustering algorithms, this invention proposes the KPD algorithm. The details of KPD algorithm are shown below.

a) For each MPC sample, say x, calculate the density $\rho$ using the K nearest MPCs as follows:

$$\rho_x=\sum_{y\in K_x}\exp(\alpha_y)\cdot\exp\left(-\frac{|\tau_x-\tau_y|}{\sigma_{\tau_y,y}\in K_x}\right)\cdot\exp\left(-\frac{|\Omega_{T,x}-\Omega_{T,y}|}{\sigma_{\Omega_{T,y},y}\in K_x}\right)\cdot\exp\left(-\frac{|\Omega_{R,x}-\Omega_{R,y}|}{\sigma_{\Omega_{R,y},y}\in K_x}\right) \quad (2)$$

where y is an arbitrary MPC that $y\neq x$, $K_x$ is the set of the K nearest MPCs for the MPC x. $\sigma_{(\cdot)y}\in K_x$ is the standard deviation of the K nearest MPCs in the domain of $(\cdot)$. In (2), we use the Gaussian Kernel density for the delay domain as the physical channels does not favor a certain distribution of delay; we use the Laplacian Kernel density for the angular domain as it has been widely observed that the angle of MPC follows the Laplacian distribution. The term of $\exp(\alpha)$ in (2) shows that MPCs with strong power increase the density, which is intuitive as the weighting of dominant MPC by power is quite natural. $\exp(\alpha)$ can increase the power difference between MPCs to a reasonable level. Besides, by including power into the Kernel density, cluster centroids are pulled to points with strong powers.

b) For each MPC sample, calculate the relative density $\rho^*$ using the K nearest MPCs' density, as follows:

$$\rho_x^*=\frac{\rho_x}{\max_{y\in K_x\cup[x]}[\rho_y]} \quad (3)$$

By using the relative density, we normalize the density over different regions, which ensures that different clusters have similar level of density, so that it is able to identify the clusters with relatively weak power. It can be seen from (3) that $\rho^*\in[0,1]$.

c) For each MPC x, if $\rho^*=1$, label it as the key MPC $\hat{x}$, thus, the set of key MPCs is obtained as follows:

$$\hat{\Phi}:=\{x|x\in\Phi,\ \rho^*=1\} \quad (4)$$

The core MPCs can be considered as the initial cluster centroids.

d) For each MPC x, define its high-density-neighboring MPC $\tilde{x}$ as:

$$\tilde{x}:=\arg\min_{y\in\Phi,\rho_y^*>\rho_z^*}\{d(x,y)\} \quad (5)$$

where d represents the Euclidean distance, then each MPC is connectted to its high-density-neighboring MPC and the link path is defined as $$p_x:=\{x\rightarrow\tilde{x}\} \quad (6)$$

thus, a link map, $\xi_1$, is obtained as follows:

$$\xi_1:=\{p_x|x\in\Phi\} \quad (7)$$

e) For each MPC, connect it to its K nearest MPCs and the link path is defined as $$q_x:=\{x\rightarrow y,\ y\in K_x\} \quad (8)$$

Thus, another lin map, $\xi_2$, can be obtained as follows:

$$\xi_2:=\{q_x|x\in\Phi\} \quad (9)$$

If i) two key MPCs are reachable in $\xi_2$ and any MPC in any path connecting the two core MPCs has $\rho^*>x$, where x is a density threshold, the two core MPCs' clusters are merged as one new cluster.

In the KPD algorithm, two parameters are required: K and x. K determines how many MPCs are used to calculate density and to yield $\xi_2$. A small K increases the sensitivity of local density variation to the clustering results, i.e., reduces the size of local region. $K=\sqrt{T/2}$ is used and a heuristic argument is as follows: in general, each cluster has $\sqrt{2T}$ points, whereas our algorithm requires that any two MPCs in each cluster are reachable in $\xi_2$ so that the cluster is compact. However, a $K=\sqrt{2T}$ usually fails to yield such compactness (i.e., any two MPCs in each cluster may not be reachable in $\xi_2$), therefore, we use $K=(\sqrt{2T})/4=\sqrt{T/2}$ as a heuristic approach to reduce the size of local region and to ensure the compactness of clustering.

The parameter $\chi$ determines whether two clusters can be merged. $\chi$ large leads to a large number of clusters. For simplicity, we suggest to set $\chi$ to 0.8, which is found to have a reasonable performance in the validation for that a large value of $\chi$ ensures that the clusters are separated from each other.

(3) Insight and Discussion of KPD Algorithm (3.1) Why the Kernel Density is used?

For cluster analysis, the variation of each data point can be modeled using a mathematical function that is called influence function. If the overall density of the data space is calculated as the sum of the influence functions of all data points, the mathematical form of the density function yields clustering with desired shape in a very compact mathematical form. For MPC clustering, the variation of MPCs is usually modeled in a statistical way. Thus, a mathematical function, namely the Kernel function, can be used to incorporate the modeled behavior of MPCs, and the resulting Kernel density favors the clustering with desired shape. It is noteworthy that the Kernel function based MPC density in (2) is flexible: the term of elevation angle can be added accordingly if 3D MIMO measurements are used; it can also be dropped if angular information is not available.

(3.2) Why the K nearest MPCs are Used?

The reason is to ensure that the estimated density is sensitive to the local structure of the data, i.e., closer neighbors contribute more.

(3.3) Why the Relative Density is Used?

The reason is similar to using the K nearest MPCs—it helps to "see" more details of local density variations so that each cluster is distinct.

(3.4) Why Clusters are Merged?

Natural clusters have small-scale fading and intra-cluster power variation exists. Therefore, there are usually too many initial clusters according to the estimated key MPCs. Thus, it is reasonable to merge those clusters that are fairly close to each other.

(4) Algorithm Validation

To validate the proposed KPD algorithm, the SCME MIMO channel model is used to generate the synthetic MPCs, which contain power, delay and angle information. For simplicity the elevation domain is disregard.

FIGS. 1A-1D and FIGS. 2A-2D show the details of KPD implementations. In FIGS. 1A-1D, 5 clusters are generated and cluster 3 is close to cluster 4. As shown in FIG. 1B, the estimated density ρ has a large dynamic range and it is difficult to identify cluster 1 and cluster 3 by setting a density threshold. However, after calculating the relative density (i.e., normalizing the local density), it is easier to identify each cluster by using the key MPCs, as shown in FIG. 1C. The final clustering result in FIG. 1D has 100% correct identification.

In FIGS. 2A-2D, 7 clusters are generated and clusters 4, 5, 6 and 7 are close to each other. As shown in FIG. 2B and FIG. 2C, the local density variations can be better observed by using the relative density. With KPD algorithm, all the 7 clusters are successfully identified in FIG. 2D.

FIGS. 3A-3D show the raw clusters in the simulated channel and the clustering results by using different algorithms. Ten clusters with different powers and delay/angular positions are generated. From 3A-3D, it can be seen that the KPM algorithm leads to wrong clustering decisions for the MPCs with −150 to −100 DOD and 0 to 180 DOA, and the DBSCAN leads to a wrong cluster number; whereas the KPD has almost 100% correct identification as shown in FIG. 3B.

Furthermore, we test the performance of the algorithm under different "cluster conditions". Two cluster conditions are considered: cluster number and cluster angular spread. Intuitively, a channel with large cluster number and angular spread would have reduced clustering performance. The F measure is used to evaluate the clustering performance, which is a robust external quality measure. More specifically, we define that "cluster" indicates the true cluster (according to the ground truth) and "class" indicates the output of the clustering algorithm. Then the F measure is defined as follows:

$$F = \sum_i \frac{l_i}{T} \max\left(\frac{2 \cdot R(i,j) \cdot P(i,j)}{R(i,j) + P(i,j)}\right) \tag{10}$$

where $l_1$ is the number of members of class i, and $$R(i,j) = l_{i,j}/l_i$$

$$P(i,j) = l_{i,j}/l_j \tag{11}$$

where R(i,j) and P(i,j) are recall and precision for class i and cluster j. $l_{i,j}$ is the number of members of class i in cluster j and $l_j$ is the number of members of cluster i. The value of the F measure ranges from 0 to 1, and a larger value indicates higher clustering quality.

Figure 4:
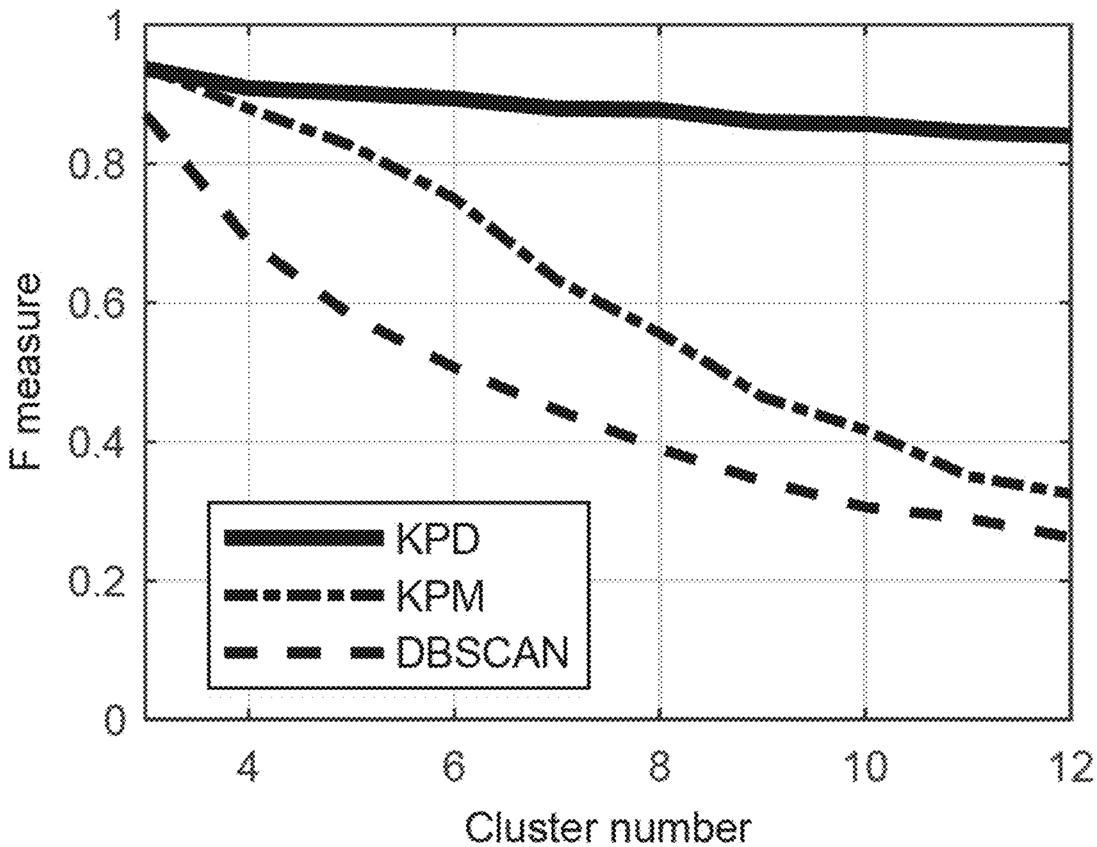
FIG. 4 shows impact of cluster number on the F measure.

First, the impact of the cluster number on the clustering accuracy is tested. SCME MIMO channel model is still used to generate MPCs, and different cluster numbers are used in the simulation. For each cluster number case, 300 random channels are simulated. FIG. 4 shows the comparison among three clustering algorithms. It is observed that the proposed KPD algorithm, having the highest value of the F measure, shows the best performance, and the value of the F measure decreases only slightly for larger cluster numbers. The KPM and DBSCAN algorithms show good performance only for a small number of clusters, and their values of the F measure decease strongly with increasing cluster number.

Figure 5:
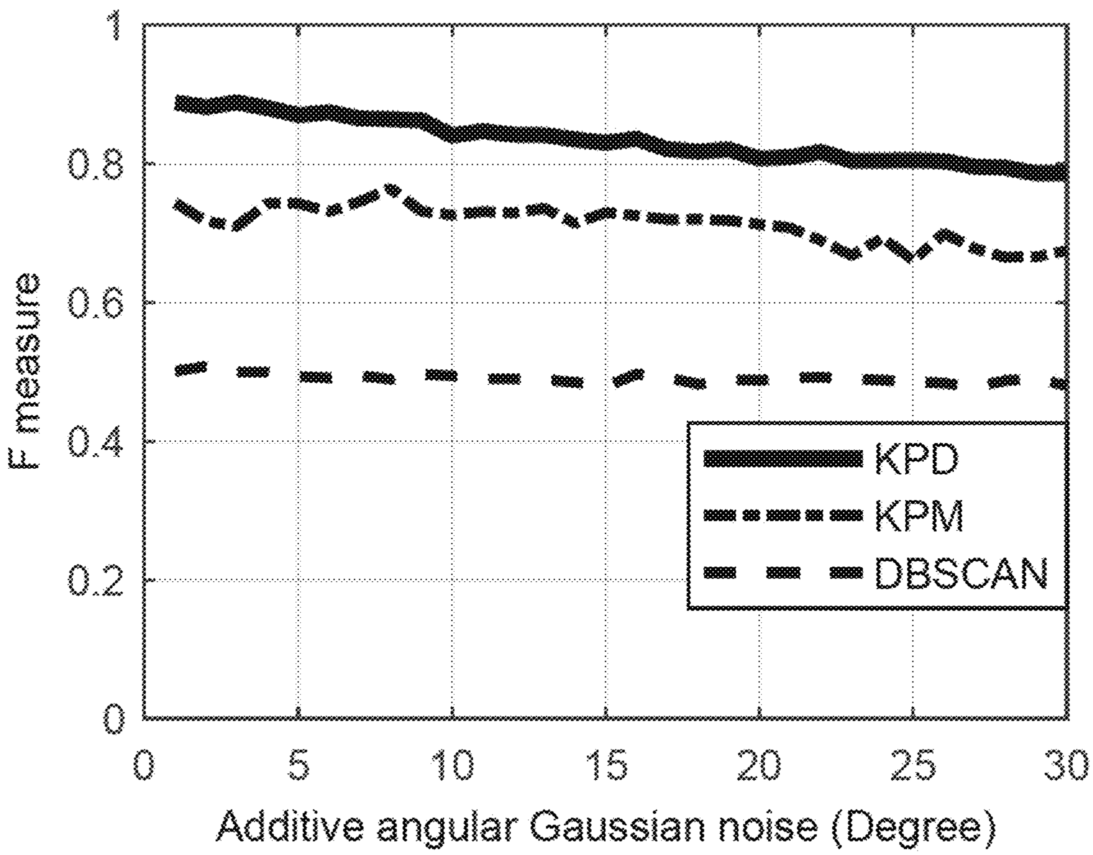
FIG. 5 shows impact of cluster angular spread on the F measure.

Second, the impact of cluster angular spread on the clustering accuracy is tested. In the simulation, the number of clusters is fixed to 6 and the different spreads are introduced by adding white Gaussian noise with variances of {1°, 2°, . . . 30°} to the MPCs DOA and DOD. 300 random channels are simulated for each cluster angular spread. FIG. 5 shows the impact of cluster angular spread on the F measure. It is found that the F measure generally decreases with the increasing cluster angular spread. The KPD algorithm shows best performance for arbitrary cluster sizes. This can be explained by the use of the Laplacian Kernel density, as the SCME model assumes a Laplacian angular distribution for MPCs.

Figure 6A:
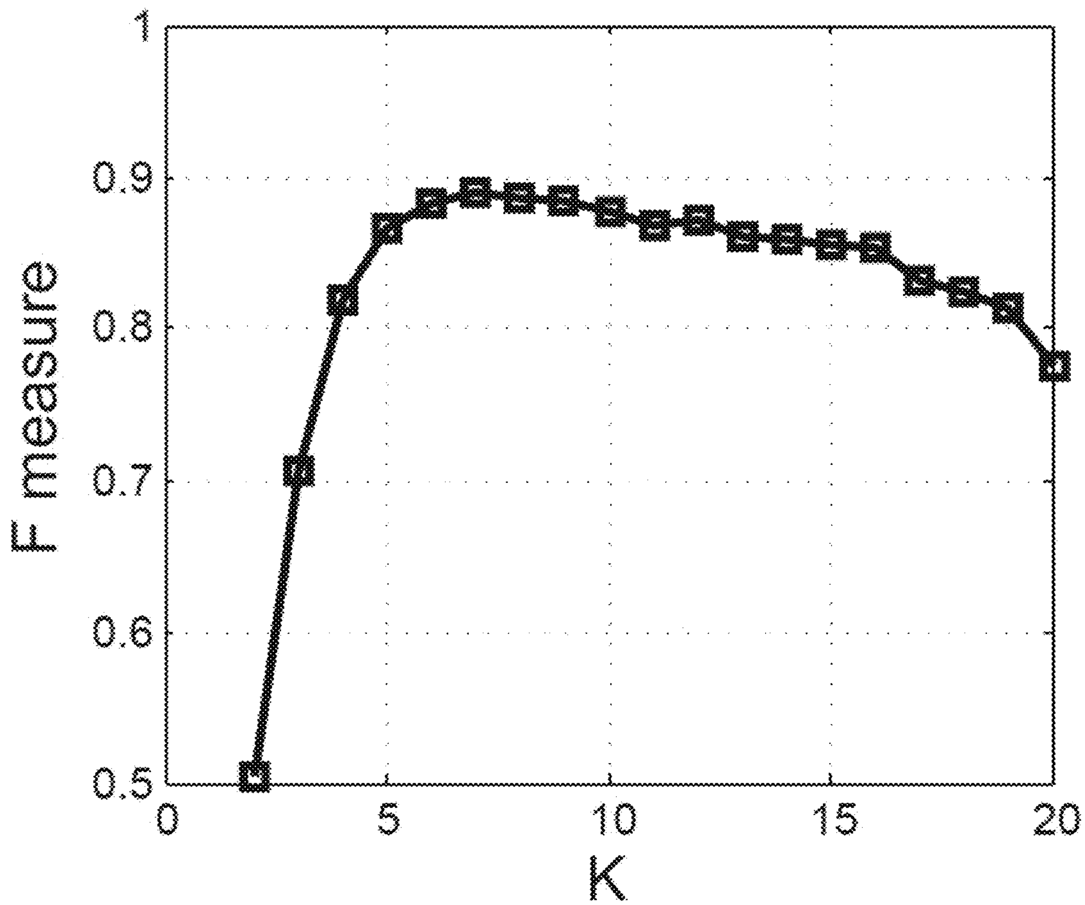
FIGS. 6A-6B show impact of algorithm parameters on the F measure.
Figure 6B:
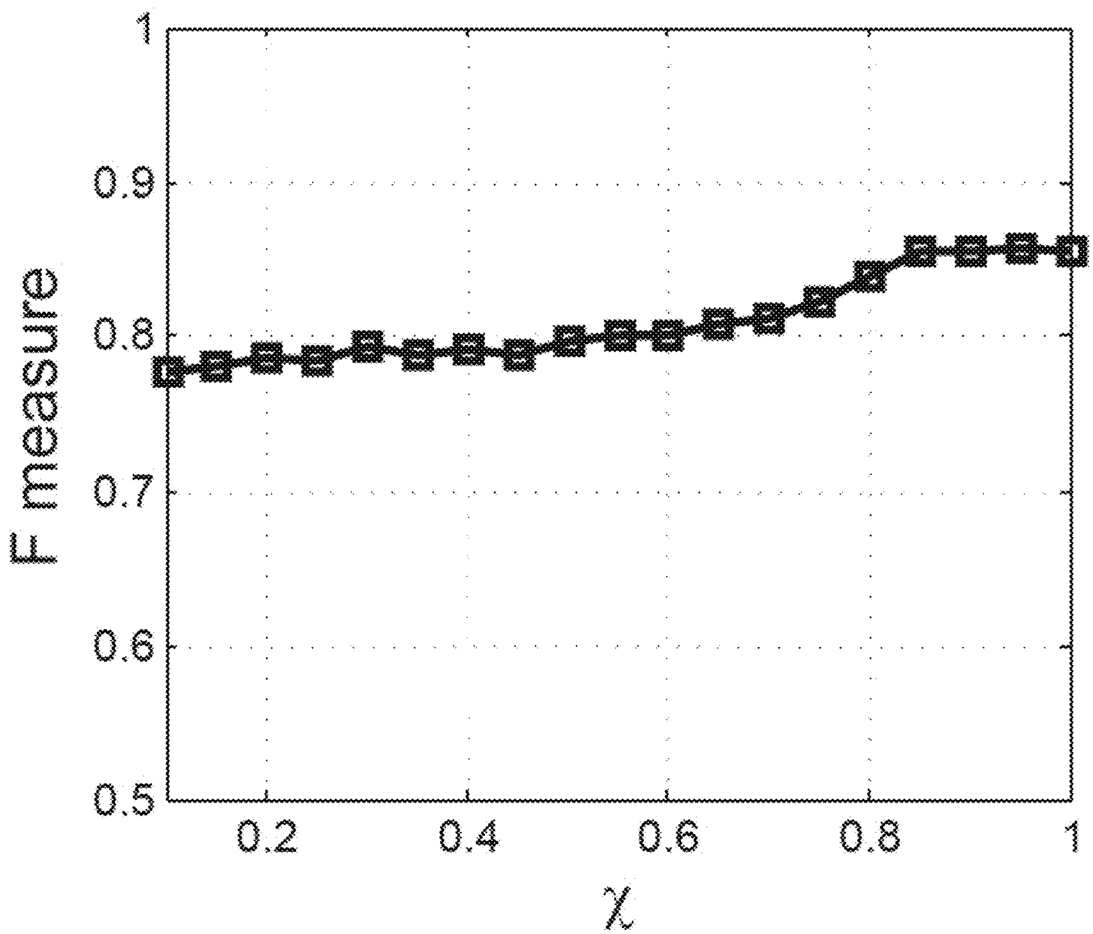
Figure 7:
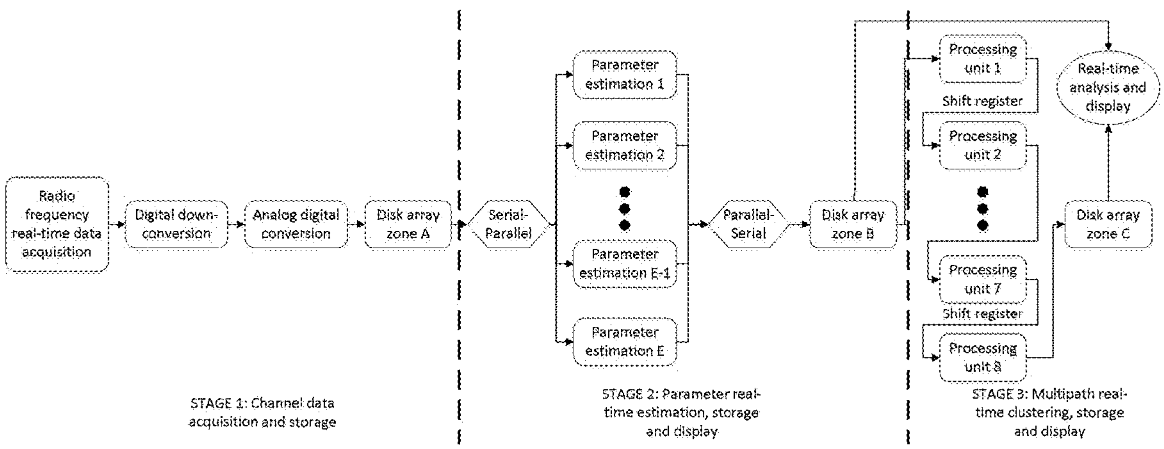
FIG. 7 shows the flowchart of this invention in channel sounder.

Then the sensitivities of K and χ to the clustering quality are discussed. FIG. 6A shows an example plot of the impact of K on the F measure, which is based on the SCME MIMO channel simulation with 300 random channels and 6 clusters. It is observed that the F measure is first increasing, and then decreasing with K. This is because a small K fails to reflect the density in a local region and a large K smooths density and erroneously drops local variations. In the simulation of FIG. 6A, $K=\sqrt{T/2}=6$, which corresponds to a high F measure. Thus, $K=\sqrt{T/2}$ is suggested for KPD clustering of MPCs. FIG. 6B shows an example plot of the impact of χ on the F measure, which is based on the SCME MIMO channel simulation with 300 random channels and 12 clusters. It can be seen that the F measure generally increases with χ. This is because a large χ reduces the erroneous cluster merging. It is also found that the F measure is fairly steady when $\chi>0.8$. Therefore, $\chi=0.8$ is suggested for KPD clustering of MPCs.

Finally, the running time of algorithm is used to evaluate the computational complexity. It is found that the total running time of MPC clustering, for one snapshot as shown in FIG. 4, is around 0.40 s, 1.14 s and 0.25 s for the KPD, KPM and DBSCAN algorithms, respectively (in Matlab 2012, with 4 GB RAM computer). This shows that the proposed KPD algorithm has fairly low computational cost. Even though the DBSCAN has the lowest computational cost, it has a low clustering quality.

In summary, the proposed KPD clustering algorithm can achieve the highest clustering accuracy with fairly low computational complexity.

In this invention, a Kernel-power-density based algorithm (i.e., KPD algorithm) is proposed for MPC clustering in wireless communication channel, which can be used for developing cluster-based statistical model of MPCs. The main features are:

1) it uses the Kernel density to incorporate the modeled behavior of MPCs into the clustering algorithm, which is also flexible for implementation;

2) it uses the relative density and only considers the K nearest MPCs in the density estimation, which is able to better identify the local density variations of MPCs;

3) it uses an effective approach to merge clusters, which improves the clustering performance;

4) the algorithm provides a trustworthy clustering result with a small number of user input, and almost no performance degradation occurs even with a large number of clusters and large cluster angular spread, which outperforms other algorithms;

5) the algorithm has a fairly low computational complexity.

The synthetic MIMO channel based on measured data validates the proposed KPD algorithm.

This invention can be used for the cluster based channel modeling for 4G and/or 5G communications.

This invention can be applied to channel sounder to analyze the clustering effect of collected channel data in real-time and output clustering results. Based on the clustering results, implement calculation, analyze and display of channel statistical characteristics in the device.

In the following, with the above content, the implementations of clustering algorithm in the channel sounder are shown in details. It is worth noting that the following illustration and the selection of parameters are just examples, which should not limit the scope of this method and its application.

Considering the channel sounder with MIMO antenna array as an example, the implementation steps are listed as follows (the flowchart is shown as FIG. 7):

Step 1: collect the real-time channel data using multi-antenna channel sounder and obtain channel impulse response in continuous time through digital down conversion and analog digital conversion. Then store them in the disk array zone A through FIFO controller.

Step 2: first, the raw data in the disk array zone A is converted to parallel. Second, estimate the parameters of baseband data by using E processors and acquire the corresponding MPCs for each parallel job (corresponding to the test data in step 1 at different times). Then, the data flows are converted from parallel to serial and stored in the disk array zone B. Due to using multiple processors, when new data are transferred to the disk array zone A, the estimation of parameters for the previous data has been accomplished, and so the real-time performance of the system is guaranteed. In addition, only parameters of MPCs are stored in the second storage medium, therefore the memory space is greatly reduced compared with storing raw data, which is conducive to the real-time processing.

If channel sounder is equipped with multi-antenna radio frequency circuit, the stored information includes amplitude, delay and angle. If channel sounder is equipped with single-antenna radio frequency circuit, only amplitude and delay information are stored. The implementations are described under the assumption that channel sounder is equipped with multi-antenna radio frequency circuit. The implementations in the channel sounder equipped with single-antenna radio frequency circuit are similar.

Step 3: Pre-allocate 8 processing units in the processor of channel sounder, which will be used for the subsequent FPGA clustering processing. The data transmission between two adjacent processing units is achieved using shift register. All processing units will share the system clock and process in parallel.

Step 4: Transmit the MPCs store channel sounder and store them in the form d in the disk array zone B into the processing unit 1 of the of a matrix unit. Suppose that there are T MPCs and they are stored in T matrix units of the processing unit 1 independently. Then, map each MPC into the power-delay-angle three-dimensional logic space and send the corresponding coordinates into the processing unit 2.

Step 5: Set up a counter with initial value 0 in processing unit 2. Considering the logic space stored in the processing unit 2, for any MPC x, successively search its nearest neighbors with respect to Euclidean distance in this space. For each neighbor (which is also a MPC point), transmit it to processing unit 3 and plus one to the counter. If the counter in processing unit 2 equals $\sqrt{T/2}$, then end the searching process.

Step 6: Calculate the KPD of MPC x according to the MPCs stored in the processing unit 3 and parameters of x stored in processing unit 2. Store the KPD in processing unit 4.

Step 7: Compute the relative KPD of x based on the information stored in processing unit 3 and delete the KPD of x from processing unit 4. Then write the relative KPD of x into processing unit 4. The relative KPD stands for the importance of x and the larger value implies that the more weights will be given to x in the subsequent processing steps of channel sounder.

Step 8: Reset the counter to zero in processing unit 2 and repeat steps 5 to 7 until the relative KPD of any MPC signal stored in processing unit 2 has been calculated. Then store these KPD data in processing unit 4.

Step 9: Search the MPCs with KPD value equaling 1, and write the number and space coordinates information of these MPCs into processing unit 5. These MPCs will be treated as the initial points of MPC clusters (i.e., initial MPC core points) in the following steps.

Step 10: Considering the logic space stored in processing unit 2 with information provided by processing unit 4, for any MPC x, search the nearest MPC whose relative KPD is larger than x, which is called the high-density-neighboring MPC of x, and a logic connected relation exists between them. Then write its index into the high-density-neighboring matrix of processing unit 6.

Step 11: Repeat step 10 until all MPCs have been processed.

Step 12: Inspecting each MPC in the channel sounder using data retrieval methods, obtain the initial clusters. The decision criterions in the processor are listed as follows. For each MPC in processing unit 2, if it is connected to an initial MPC core point in processing unit 5 according to the logic relation stored in processing unit 6, then it will be attributed to the cluster represented by the initial MPC core point.This MPC signal is regarded as the internal data of the initial MPC core point. Thus, the initial clustering of MPCs have been finished and write the cluster index into processing unit 7 for each MPC.

Step 13: Update the cluster index of each MPC in processing unit 7 using data retrieval methods continuously. The updating criterions in the processor are listed as follows. For two initial MPC core points in processing unit 5, they will be merged if following two conditions hold. First, they are connected with respect to the logic relation mentioned in step 5). Second, there exists a path that the relative KPD of each point in the path is larger than 0.8 between the two initial MPC core points. Remarkably, “merge two initial MPC core points" implies that all MPCs belonging to the two initial MPC core points will be re-assigned a same new cluster index.

Step 14: Count for different cluster numbers in processing unit 7. Sort the different cluster numbers increasingly and renumber each cluster as its rank in the sorted sequence. The results will be stored in processing unit 8.

Step 15: After the running of the clustering algorithm, write the results in processing unit 8 into the disk array zone C and visualize the clustering result according the information stored in the disk array zones B and C. The visualizing result will be displayed in the screen of channel detector.

According to this invention, the proposed method incorporates the statistical distribution of MPCs' characteristics and the powers by using Kernel function, solves the traditional challenge of lacking prior information, and thus can serve the cluster-based wireless communication channel modeling and communication system design. Therefore, it has strong applicability and practicability.

The above mentioned contents are just one preferred approach of embodiments, whereas the protection scope of protection of the invention is not limited by this. Many details of this invention can be varied and replaced by experts those skilled in the art, which are also covered within the protection scope of protection. Thus, the protection scope of protection of the invention should refer to what aredefined by the attached Claims.

The invention claimed is:

1. A method for clustering wireless channel and multipath components (MPCs) based on a Kernel Power Density (KPD) Doctrine to make signals get to a receiver from a transmitter via multipath propagation, in which multiple-input-multiple-output (MIMO) channels are modeled as double-directional channels, double-directional pulse response contains data on power, delay, direction of departure (DOD) and direction of arrival (DOA) of multipath component (MPC);

MPCs of wireless channel tend to appear in clusters, the MPCs in each cluster have similar parameters of power, delay and angle, all MPC parameters are estimated from measurement data by using high-resolution processing procedure;

a data snapshot is performed with several clusters, each of which has a number of MPCs represented by the power, delay, DOD and DOA, characterized in that said method comprises the following steps:

a) collecting real-time channel data using a multi-antenna channel sounder to continuously acquire raw channel impulse response data and store a raw channel impulse response data in a first storage medium through a First Input First Output (FIFO) controller;

b) transporting the raw channel impulse response data stored in the first storage medium to a serial-parallel converter, while simultaneously estimating parameters of a baseband response data with multiple parameter estimating processors so as to acquire a corresponding MPC signal for each parallel job; then transferring the estimated parameters of the MPC signals to a parallel-serial converter and storing an MPC result in a second storage medium;

c) using at least eight processors, or different storing areas in one processor, in the multi-antenna channel sounder for a subsequent clustering process in FPGA, in which any data transmission between two adjacent processing units is achieved using shift registers, and all processing units share just a same system clock and perform a parallel process;

d) transmitting the MPC results stored in the second storage medium into a processing unit 1 of the multi-antenna channel sounder and storing them in a form of a matrix unit;

e) setting up a counter with an initial value 0 in a processing unit 2, successively searching a nearest neighbor of any MPC x with respect to Euclidean distance in a logic space stored in the processing unit 2, and transmitting it to a processing unit 3 and adding plus one to a counter in processing unit 2;

f) determining an original KPD of the MPC x according to all MPCs stored in a processing unit 3, a parameter(s) and their statistical distribution characteristics of the x stored in the processing unit 2, and storing the determined KPD in a processing unit 4;

g) determining a relative KPD of the x in an inner processor based on data stored in the processing unit 3; deleting the original KPD of the x previously stored in the processing unit 4, and storing the relative KPD of the x into the processing unit 4;

h) resetting the counter to zero in the processing unit 2 and repeating steps 5) to 7) until the relative KPD of every MPCs in the processing unit 2 is obtained, and storing all relative KPD data in the processing unit 4;

i) searching the MPCs with a KPD value equaling to 1 in the processing unit 4, and writing any index of the MPCs with a KPD value equaling to 1 and its corresponding 3D coordinates in the processing unit 2 into a processing unit 5;

treating these MPCs as the initial centers of MPC clusters in later steps;

i) searching, in the processing unit 2 of the multi-antenna channel sounder, any MPC which is nearest to an MPC x and whose relative KPD is larger than x, with 3D coordinates and data stored in the processing unit 4, so as to obtain a high-density-neighboring MPC of the x, which is with a logic connection relationship with respect to the nearest MPC x, and whose index is stored in a high-density-neighboring matrix of a processing unit 6;

k) repeating step h) until all data in the processing unit 2 have been processed, and then storing an index of the high-density-neighboring MPC of the x and an index of logic connection relationship in the high-density-neighboring matrix of the processing unit 6;

I) inspecting each MPC stored in a memory of a disk of the multi-antenna channel sounder using data retrieval methods, obtaining initial clusters of all MPCs stored in the memory of the disk, thus finishing an initial clustering of all MPCs in the processing unit 2, and storing any cluster index of each MPC into a processing unit 7;

m) continuously updating the cluster index of each MPC in the processing unit 7 using the data retrieval methods;

n) counting for different cluster indexes in the processing unit 7, sorting the different cluster indexes, renumbering each cluster index as its rank in a sorted sequence, and storing each continuous index in a processing unit 8; and o) transmitting the data stored in the multi-antenna channel sounder of the processing unit 8 into a third storage medium, thus completing the clustering process for the MPCs.

2. The method as defined in claim 1, characterized in that a) for each MPC x, its density is resulted from its K nearest neighbors; during forming the density, according to statistic characteristics of MPCs, Gaussian Kernel density weighted factor is adopted for a delay domain, and a Laplacian Kernel density weighted factor is adopted for an angular domain, in order to improve agreement between density estimation and statistic characteristics of MPCs; for a power domain, exponential Kernel density weighted factor is adopted, so as to expand a power difference among different MPCs; the power is introduced into a Kernel density to make the resulted cluster centers more close to a highest power point among the MPCs;

b) for each MPC, a relative density is resulted from its K nearest neighbors; a density is normalized in different regions by using the relative density, resulting in that different clusters have similar levels of density, so as to easily note low power clusters;

c) for each MPC x, a set of MPC core points is obtained, and these core points are set to each initial cluster center;

d) for each MPC x, it is connected to its high-density-neighbor, so as build link paths, and thus a link map is obtained;

e) for any MPC, it is connected to its K nearest neighbors so as to build link paths, thus a link map is obtained, the continuous channel impulse response data is acquired through digital down-conversion and analog-digital conversion;

said first storage medium, second storage medium and third storage medium are disk array zones A, B and C, respectively, and are all arranged in the same disk;

if the multi-antenna channel sounder is equipped with a multi-antenna radio frequency circuit, the stored MPC includes information on amplitude, delay and angle, while if the multi-antenna channel sounder is equipped with a single-antenna radio frequency circuit, only information on amplitude and delay are stored in the MPC;

8 processing units are pre-allocated in the processor of the multi-antenna channel sounder;

each MPC is individually stored in a different matrix unit of the processing unit 1;

each MPC stored in its matrix unit is arranged to map into a three-dimensional logic space of power-delay-angle, and its corresponding coordinates are stored in the processing unit 2;

if the counter in the processing unit 2 equals to $\sqrt{T/2}$, then a searching process in the processing unit 2 is ended;

decision criterions in the processor are listed as follows: according to a logic relationship stored in the processing unit 6, if any MPC stored in the processing unit 2 corresponds to a same initial MPC core point in the processing unit 5, it belongs to a cluster represented by the initial MPC core point;

updating criterions in the processor are listed as follows: if any two initial MPC core points in the processing unit 5 are connected with respect to a logic neighbor relationship mentioned in step (e) and there exists a path between the two initial MPC core points in which the relative KPD at each point is larger than 0.8, a same new cluster index is updated for all MPCs belonging to the two initial MPC core points and there between in the processing unit 7; and/or the results in the processing unit 8 are stored into a disk array zone C, the clustering results of MPCs are visualized according to the data stored in the disk array zones B and C, and the visualizing results are displayed in the screen of the multi-antenna channel sounder.

3. The method as defined in claim 2, characterized in that if i) two MPC core points are connected in the link map; ii) there exists a path between these two points in which the relative KPD of each MPC is larger than a density threshold, then the two clusters represented by the two MPC core points are merged into one cluster;

K determines a quantity of local MPCs used when a density is resulted so as to obtain the link map; a smaller K leads to a higher sensibility of a clustering results to a variations of local density, which is equivalent to reduce the size of local region $K=\sqrt{T/2}$, each cluster generally contains $\sqrt{2T}$ samples, to make the cluster fairly compact;

$\chi$ determines whether any two clusters can be merged; a larger value of $\chi$ leads to a greater number of clusters and higher separation among clusters; and/or preferably, $\chi$ with a value of 0.7 to 1.0 leads to a desirable result; more preferably, $\chi$ is 0.8.

4. The method as defined in claim 2, characterized in that a Kernel density weighted factor is introduced based on a Kernel function, incorporating distribution characteristics of MPCs' power, delay and angle into clustering process; under a condition of 3D MIMO measurements, a Kernel factor of elevation angle can be also added into the Kernel function based on data of 2D measurement, thus, in each domain, the statistical distributions of the MPCs in resulting clusters tend to be similar to the corresponding Kernel functions;

during determining an MPC density, only the K nearest neighbors of each MPC are processed, ensuring that an estimated density is fairly sensitive to variations of local density;

to reflect the variations of the local density, a "relative density" is used, so as to easily detect the clusters with different densities;

clusters that are close to each other are merged, so as to avoid having too many clusters due to power fading of the MPCs.

5. The method as defined in claim 2, characterized in that any statistical characteristics of MPC parameters in different domains are incorporated into a clustering process using a Kernel density based process;

when estimating an MPC density, only the K nearest neighbors are processed with a "relative density", so as to identify variations of local MPCs' densities; and performance of MPC clustering is effectively improved by merging clusters of MPCs;

a real-time processing of channel data is achieved by using a channel sounder.

6. The method as defined in claim 5, characterized in that with help of an FPGA chip within the channel sounder, a clustering effect of MPCs is analyzed in real time, outputting clustering results; based on clustering results, calculation, analyzation and display of any channel statistical characteristics inside a device are performed.

7. The method as defined in claim 5, characterized in that both statistical characteristic distributions of the MPCs and powers of the MPCs are incorporated by using Kernel functions.

8. The method as defined in claim 5, characterized in that a problem of lacking preceding information of MPC clusters in prior art is overcome, so the present invention can be used for cluster-based wireless communication channel modeling and communication system design; both statistical characteristics and powers of the MPCs are used in Kernel density; variations of the local MPCs' densities can be better identified with the preceding information of clusters or not; the present invention is suitable for the cluster oriented channel processing technology in future wireless communication field.

* * * * *